May 9, 1939. A. KEEL 2,157,240

VALVE STRUCTURE

Filed Feb. 21, 1935 3 Sheets—Sheet 2

INVENTOR
Adolf Keel.
BY
Harness, Dickey, Pierce & Hann
ATTORNEYS.

May 9, 1939.   A. KEEL   2,157,240

VALVE STRUCTURE

Filed Feb. 21, 1935   3 Sheets-Sheet 3

INVENTOR
Adolf Keel.
BY
Harness, Dickey, Pierce & Hann
ATTORNEYS.

Patented May 9, 1939

2,157,240

UNITED STATES PATENT OFFICE 2,157,240

VALVE STRUCTURE

Adolf Keel, Highland Park, Mich., assignor to Ex-Cell-O Corporation, a corporation of Michigan Application February 21, 1935, Serial No. 7,546

14 Claims. (Cl. 121—45)

This invention relates to valve structures and particularly to a valve structure of the fluid pressure controlled type adapted to control the flow of fluid under pressure to and from one or more parts to cause actuation of the same or to vary the actuating movements thereof, and is a continuation in part of my application for Letters Patent of the United States for Improvements in hydraulically operated valve filed December 30, 1933, Serial No. 704,665 (abandoned). The principal object of the present invention is the provision of a structure of the type described that is simple in construction, efficient in operation, and relatively economical to produce.

While in the broader aspects the present invention is applicable to operation by air or other gas under pressure and may be employed for controlling the flow of air or other gas under pressure to a part or parts to be operated thereby, it is particularly designed for use in connection with so-called hydraulic motors, that is, for controlling the movement of one or more pistons in a corresponding number of cylinders and which are adapted to be actuated by liquid, such as cil, in order to permit it to accomplish some useful function. In view of the fact that such hydraulic motors must necessarily be provided with a source of oil under pressure such source may also be conveniently employed for the purpose of controlling the actuation of the valve structure of the present invention. Accordingly, in the accompanying description and drawings it will be assumed that the fluid employed for both actuating the valve and controlled by the valve is a liquid, the use of other types of fluids thus being readily apparent to those skilled in the art.

Objects of the invention include the provision of a valve structure for controlling the flow of fluid under pressure to and from a part to be actuated thereby, together with fluid pressure means for controlling the position of the valve so as to control the direction of movement and/or rate of movement of a hydraulically actuated part or parts; the provision of a valve structure for controlling the flow of fluid under pressure to and from one or more parts to be actuated thereby and including a shiftable piston valve member, means being provided for controlling the position of the piston valve member in its body including one or more pressure operated plungers together with fluid pressure operated stop members surrounding the plungers and engageable with said piston valve member to cause movement of the same and/or to limit the movement of the same in response to operation of the fluid pressure operated plungers; the provision of a pressure actuated fluid pressure control valve including at least a pair of pressure actuated members at one end of the valve for actuating the movable valve member and/or providing stops for movement thereof, and in which the pair of pressure actuated members are so constructed and arranged that one is included within the length of the other thereby providing a structure of relatively short length; and the provision of a valve structure for controlling the flow of fluid under pressure to and from a part or parts to be operated thereby, the valve structure including a shiftable piston valve member, and means being provided for controlling the shiftable position of the piston valve member including a pressure actuated plunger at each end thereof and a pressure actuated collar surrounding each of the last mentioned pressure actuated pistons, the whole being so constructed and arranged as to enable the slidable piston valve member to be shifted to any one of five different positions whereby to effect a corresponding control of the flow of fluid under pressure through the valve.

Further objects of the invention include the provision of a work table and a hydraulic motor for effecting movement thereof in alternately opposite directions, in combination with a valve mechanism for controlling the flow of fluid under pressure to and from the hydraulic motor, the valve mechanism in turn being controlled in the various operative positions thereof by means of pressure actuated members in turn controlled by the operative position of the work supporting member; the provision of a work supporting member, a hydraulic motor for the same including corresponding pistons and cylinders of different diameters operatively connected to the work supporting member, and a valve mechanism for controlling the flow of fluid under pressure to and from the hydraulic motor so constructed and arranged as to enable the flow of such fluid under pressure with respect to the hydraulic motor to enable the work supporting member to be driven in opposite directions of movement at different rates of speed, together with fluid pressure operated means for controlling the position of the vave mechanism in accordance with the desired direction and rate of speed of the work supporting member; and the provision of a pair of hydraulic motors and a valve mechanism for controlling the flow of fluid under pressure to and from the hydraulic motors so constructed and arranged as to govern the direction of movement of the hydraulic motors as well as the sequence of operation of one with respect to the other, together with pressure actuated means for controlling the operative position of the valve mechanism in accordance with the desired direction of movement of and sequence of operation of the hydraulic motors.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Figure 1:
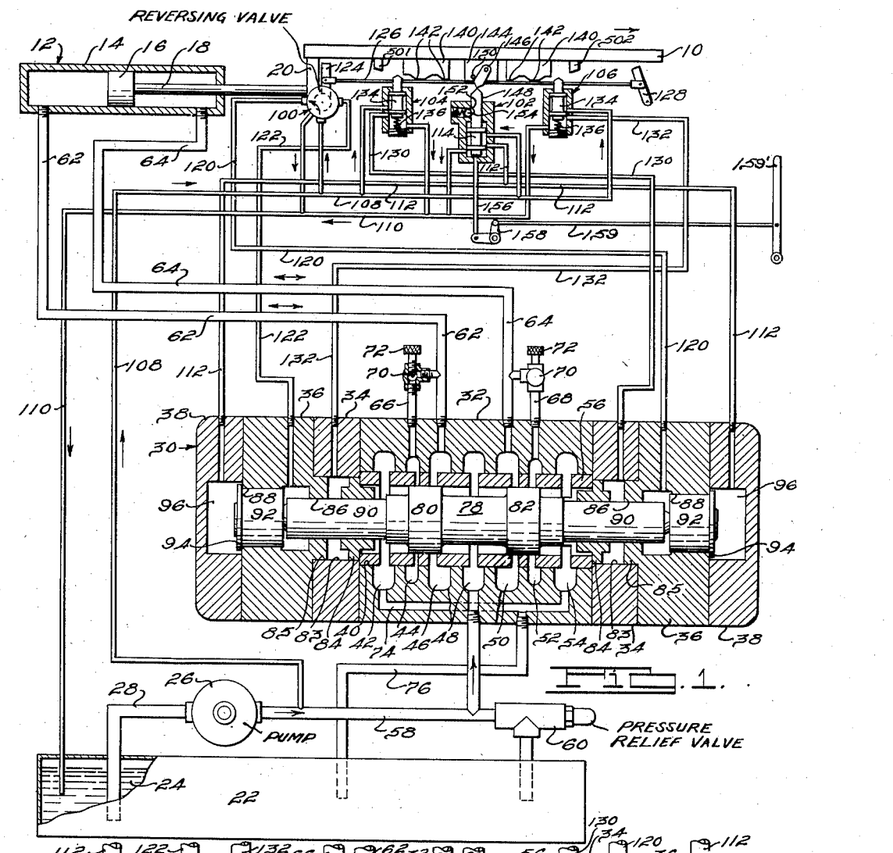
Fig. 1 is a more or less diagrammatic, partially broken, partially sectioned view showing the application of a hydraulic motor to the table or slide of a machine tool, and illustrating a preferred form of control valve for the hydraulic motor, the hydraulic valve being shown in section taken axially therethrough.

Referring to the drawings and particularly to Fig. 1 a table or slide is shown at 10 as illustrative of a part or member which it may be desired to move by means of a hydraulic motor such as that generally indicated at 12. The table may be that of any desired type of machine tool or the like upon which work to be operated upon may be mounted or upon which a tool or tool assembly, such for instance as a drill head, may be mounted and moved thereby for the purpose of performing some operation upon a piece of work otherwise supported. For the purpose of illustrating the present invention it may be considered that in accordance with conventional practice it is desired to move the slide 10 in one direction first at a relatively rapid rate to bring a tool and a piece of work into closely adjacent relationship, and thereafter slow down the speed of travel of the slide 10 in such direction for the purpose of permitting the tool to operate upon the work at a suitable feeding rate of speed. It may also be assumed that as soon as the tool has completed its operation upon the work it is desired to stop further movement of the slide 10 in such direction and to rapidly return it to an initial starting point.

As a matter of illustration only the hydraulic motor 12 is shown as being mounted at one end of the slide 10. The hydraulic motor 12 is shown as comprising a cylinder 14 within which a piston 16 is reciprocable, the rod 18 of the piston 16 extending through the right hand end of the cylinder 14 as viewed in Fig. 1 and having its projecting end fixed to a downwardly projecting lug or bracket 20 also fixed to the slide 10.

For the purpose of causing operation of the hydraulic motor 12 it is necessary to employ a fluid and preferably a liquid under pressure and for this purpose a tank 22 is shown as being filled with a suitable liquid 24 from which a suitably driven pump 26 withdraws liquid through the conduit 28. The present invention deals particularly with the valve mechanism whereby the liquid under pressure from the pump 26 may be delivered to the proper end of the hydraulic motor 12 and the liquid from the opposite end of the hydraulic motor returned to the tank 22, the rate of return of such liquid to the tank 22 being controlled to control the rate of movement of the slide 10 in the manner above discussed. In accordance with the present invention the position of the valve mechanism is governed by fluid pressure and inasmuch as it is necessary to provide fluid pressure as above described to cause operation of the hydraulic motor 12, the same source of pressure is preferably employed as will hereinafter be described to effect operation of the valve device. The application of this fluid pressure to the valve device is governed in the embodiment of the invention shown in Fig. 1 through the operation of auxiliary or pilot valves operated in accordance with the movable position of the slide 10.

Figure 2:
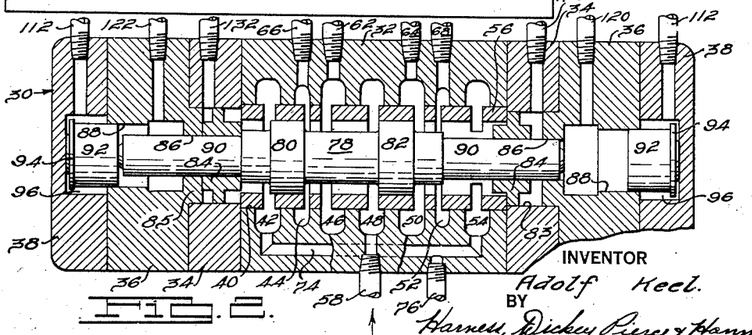
Fig. 2 is a slightly enlarged sectional view taken through the axis of the control valve illustrated in Fig. 1 and showing the valve in a different operative position.
Figure 3:
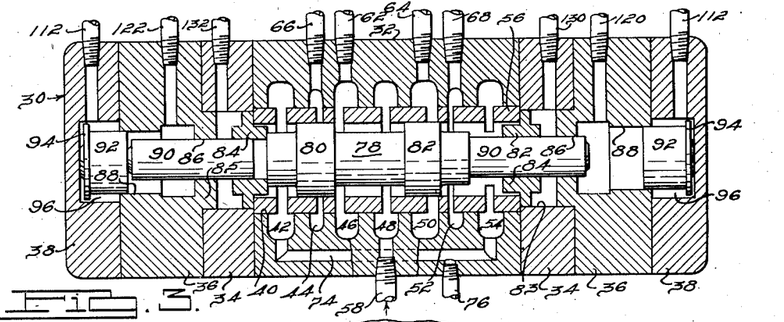
Fig. 3 is a view similar to Fig. 2 but showing the control valve in a still different position of operation.

In Figs. 1, 2 and 3 the valve device is indicated generally at 30. The valve device 30 is of symmetrical construction on either side of its center and includes a central main body portion 32 and end members 34 and 36 and cap 38 at each end thereof. The main body portion 32 is provided with an axial bore 40 and this bore is provided with a plurality of axially spaced annular grooves or pockets 42 to 54, inclusive. A sleeve 56 is closely fitted within the bore 40 so as to be in sealing contact with the walls thereof and is provided with a plurality of circumferentially extending slots therethrough corresponding to the grooves 42 to 54, inclusive, and axially spaced from one another so as to open into the corresponding grooves.

The discharge side of the pump 26 is connected by means of a duct 58 to the central groove 48, and this duct is provided with a by-pass leading back to the tank 22 in which a pressure release valve 60 is interposed in order to govern the maximum pressure built up by the pump and more particularly to provide a constant head of pressure under which to operate the hydraulic motor 12. The groove 46 immediately to the left of the groove 48 as viewed in Fig. 1 is connected by an unrestricted duct 62 with the left hand end of the cylinder 14 of the hydraulic motor 12 and the groove 50 immediately to the right of the central groove 48 is connected by means of an unrestricted duct 64 with the right hand end of the cylinder 14. The grooves 44 and 52 to the left and right respectively of the grooves 46 and 50 are connected by conduits 66 and 68 respectively with the conduits 62 and 64 respectively, and the conduits 66 and 68 are each provided with means for restricting flow therethrough, and while such means may be of any suitable type they are preferably adjustable and are indicated in the drawings as needle valves 70 provided with an adjustable needle or valve member 72. The axially outer or end grooves 42 and 54 respectively are connected with each other by a duct 74, shown formed within the main body portion 32, and which in turn is connected by an unrestricted duct 76 with the sump or tank 22.

Within the sleeve 56 a piston valve indicated generally at 78 is reciprocably received, this valve having axially spaced piston portions 80 and 82 respectively which relatively closely fit the interior of the sleeve 56 and serve to control the flow of liquid through the various slots in the sleeve 56, the remaining portion of the valve 78 being radially relieved so as to permit the flow of fluid axially thereof between the unrelieved portions.

With the construction as thus far described and considering for the moment that the ends of the main body portion 32 are closed against the escape of fluid therefrom, it will be noted that when the piston valve 78 is in its central position indicated in Fig. 1 liquid under pressure fed from the pump 26 through the duct 58 into the groove 48 will pass through the corresponding slot in the sleeve 56 to the interior of the sleeve and around the piston valve 78 between the portions 80 and 82 thereof. In this position of the piston valve 78, however, the portions 80 and 82 are blocking escape of liquid from the groove 48 through the sleeve 56 into any other slot in the sleeve 56 and consequently prevents the flow of liquid under pressure from the pump through the groove 48 to any of the grooves 42 to 54, inclusive. At the same time the portion 80 has closed the slot in the sleeve 56 communicating the interior of the sleeve 56 with the groove 46 and consequently the duct 62, and likewise the slot in the sleeve 56 which communicates the interior of the valve through the groove 44 and duct 66 with the duct 62. Consequently in this position of the valve illustrated in Fig. 1 it is impossible for any flow of liquid to take place either toward or from the left hand end of the cylinder 14 through the duct 62. Similarly, the portion 82 of the piston valve 78 has closed the slots in the sleeve 56 communicating with the grooves 50 and 52 and consequently prevents any flow of liquid to or from the right hand end of the cylinder 14 through the ducts 64 and 68. Thus in the position of the valve illustrated in Fig. 1 no flow of liquid is possible to or from either end of the cylinder 14 and consequently the piston 16 and slide 10 are effectively locked against movement.

If the piston valve 78 is shifted from its neutral or central position indicated in Fig. 1 to its extreme left hand position indicated in Fig. 2, the portion 82 of the piston valve in moving to the left uncovers the slots in the sleeve 56 leading to the grooves 50 and 52, and the portion 80 of the piston valve uncovers the slots in the sleeve 56 leading to the grooves 44 and 46. The slot in the sleeve 56 communicating the groove 48 with the interior of the sleeve 56 is, however, still open to the flow of liquid under pressure from the pump. Consequently this fluid under pressure flows from the groove 48 to the interior of the sleeve 56 and being blocked against flow to the right by the portion 82 of the piston valve, flows through the slots in the sleeve 56 leading to the grooves 44 and 46 and consequently through the ducts 62 and 66 to the left hand end of the cylinder 14 of the hydraulic motor, thus communicating the pump pressure to the left hand end of the piston 16 and tending to urge it towards the right as viewed in Fig. 1. In this position of the valve mechanism as indicated in Fig. 2 the ducts 64 and 68 which connect with the right hand end of the cylinder 14 of the hydraulic motor have been cut off by the portion 82 of the piston valve 78 from the pressure of the pump, but at the same time the slots in the sleeve 56 corresponding with the grooves 50 and 52 have been opened to the flow of liquid therethrough and consequently the liquid in the right hand end of the cylinder 14 is forced by the pressure acting on the left hand end of the piston 16 through the ducts 64 and 68 into the grooves 50 and 52 and thence through the corresponding slots in the sleeve 56 to the interior of the sleeve where it flows axially thereof and through the slots in the sleeve 56 leading into the groove 54 from which it passes through the ducts 74 and 76 to the tank or sump 22.

Thus with the valve in the position indicated in Fig. 2 the flow of liquid under pressure from the pump 26 to the left hand end of the cylinder 14, and the flow of liquid from the right hand end of the cylinder 14 to the sump 22 is unrestricted and the piston 16 and slide 10 will be moved at their maximum rate of speed to the right as viewed in the drawings. As will be readily understood, if the piston valve 78 were shifted to its corresponding maximum position of movement to the right instead of to the left, as viewed in Fig. 2, then the liquid under pressure from the pump 26 instead of being delivered into the grooves 44 and 46 would be delivered into the grooves or pockets 50 and 52 and thence through the ducts 64 and 68 to the right hand end of the cylinder 14, and the liquid in the left hand end of the cylinder 14 would be discharged through the ducts 62 and 66 to the grooves or pockets 44 and 46 through the interior of the valve to the pocket or groove 42 and thence through the ducts 74 and 76 to the sump 22, resulting in maximum speed of movement of the piston 16 and slide 10 to the left instead of to the right as described in connection with the position of the mechanism shown in Fig. 2.

If the piston valve 78, instead of being shifted to the extreme extent of its movement to the left as viewed in Fig. 2 is shifted to an intermediate position only, as illustrated in Fig. 3, then the piston valve 78 in moving to the left will shift the portion 82 thereof only to a sufficient extent to uncover the slot in the sleeve 56 leading to the groove or pocket 52, but would still close the slot leading to the groove or pocket 50. At the same time the portion 80 will move to the left to an extent sufficient to uncover the slot in the sleeve leading to the groove of pocket 46 but will still close the slot leading to the pocket 44. Under such circumstances the liquid under pressure from the pump 26 will flow through the valve into the duct 62 unrestrictedly and thence to the left hand end of the cylinder 14 to exert its pressure upon the left hand end of the piston 16. The liquid thus forced out of the right hand end of the cylinder 14, however, will flow through the duct 64 until it reaches the point of junction of the duct 64 with the duct 68, but will be unable to flow any further through the duct 64 due to the fact that the slot in the sleeve 56 leading to the groove 50 is now closed, and consequently this will limit the flow of liquid from the right hand end of the cylinder 14 through the duct 68 and corresponding restriction 70 only to the pocket 52 and then through the interior of the valve through the pocket 54 and thence to the sump 22 in the manner previously described.

The liquid thus forced from the right hand end of the cylinder 14 in such case in being forced in its entirety through the restricting valve 70 in the conduit 68, will limit the speed at which the liquid under pressure in the left hand end of the cylinder 14 may move the piston 16 and slide 10 to the right, and by this means the speed of the slide 10 may be reduced to an extent as governed by the degree of restriction of the valve 70 an amount sufficient, for instance, for relative tool and work feeding purposes. It will be noted that in order to effect a reduction in the speed of the piston 16 and slide 10 it is the liquid that is being discharged from the hydraulic motor 12 that is throttled rather than the liquid that is being fed to it, as in this manner a constant and positive rate of speed may be obtained between the tool and the work.

As will also be readily understood, if the piston valve 78 were shifted a corresponding distance from its neutral position to the right instead of to the left as viewed in Fig. 3, then the piston 16 and slide 10 would be caused to move to the left, instead of to the right as controlled by the position of the valve shown in Fig. 3, the liquid from the pump 26 in such case being fed in unrestricted flow to the right hand end of the cylinder 14 and being discharged from the left hand end of the cylinder 14 to the sump 22 through the restricting means 70 in the duct 66.

In order to effect movement of the piston valve 78 to the various positions above described, the valve 30 is further constructed as will now be explained. Each of the members 34 is provided with a central bore 83 concentric with the bore 40 of the main body portion 32 but of slightly smaller diameter so as to enable it to abut against the corresponding end of the sleeve 56 and thereby retain the sleeve 56 in axially fixed position. Slidably received in each of the bores 83 is a piston member 84 in the form of a ring or collar. Each member 36 is provided with a pilot portion 85 located within the corresponding end of the corresponding bore 83 so as to centrally locate it with respect thereto, and is provided with a passage therethrough concentric with the axis of the piston valve 78 and including a cylindrical portion 86 corresponding in diameter to the internal diameter of the collars 84, and a portion 88 of larger diameter positioned outwardly of the portion 86 with respect to the center of the valve. An elongated piston plunger 90 is reciprocably received within each of the bore portions 86 and corresponding collar pistons 84 as illustrated. In each of the bore portions 88 a plunger piston 92 is reciprocably received, and each of these plungers 92 is provided on its outer end with a flange 94 which projects radially outwardly therefrom and is adapted to abut against the outer face of the corresponding member 36 to limit inward movement with respect thereto. Each of the cover members 38 is centrally recessed as at 96 to permit the reciprocation of the corresponding plunger 92 therein. Means are provided as will hereinafter be more fully explained to admit fluid under pressure to the outer faces of the plungers 90 and collars 84 to effect movement of the piston valve 78, to selectively admit pressure to the axially outer faces of the collars 84 to limit movement of the piston valve 78, and to admit fluid under pressure to the outer faces of the plungers 92 to move and/or limit movement of the piston valve 78 through the intermediary of the plungers 90.

For instance, to position the piston valve 78 as indicated in Fig. 1, fluid under pressure is admitted to the recesses or pockets 96 and this pressure acting over the area of the plungers 92 causes the plungers 92 to move axially inwardly, and in moving inwardly to the extremity of their movement in this direction act through the plungers 90, which in turn contact the corresponding ends of the piston valve 78, to move and hold the piston valve 78 in its central or neutral position shown in Fig. 1. It will be observed that application of fluid pressure to the recesses 96 will effect the above described positioning of the piston valve 78 regardless of whether fluid under pressure is also admitted to the outer ends of the plungers 90 and collars 84, as in such case the superior area of the plunger 92 will overcome any opposing force which might be created by the same unit pressure acting over the outer ends of either one or the other of the plungers 90, and the plungers 90 being slidable in the corresponding collars 84, the corresponding collars 84 can have no effect upon this phase of movement of the piston valve 78.

If it is desired to move the piston valve 78 from the position indicated in Fig. 1 to the position indicated in Fig. 2, then all that will be necessary is to relieve the fluid pressure acting upon the outer ends of the plungers 90 and 92 and collar 84 at the left hand end of the valve 30 as viewed in the drawings, and applying fluid pressure to the outer end of the right hand plunger 90 which will thereupon be caused to move to the left and thereby move the piston valve 78 and left hand collar 84 and left hand plungers 90 and 92 to the left, the latter movement being possible because under the circumstances the fluid pressure against the outer faces of these last mentioned members has been relieved. Movement of the piston valve 78 in this last mentioned direction to the position shown in Fig. 2 may be limited either by the left hand collar 84 contacting both the left hand end of the piston valve 78 and the inner end of the pilot 85 on the corresponding member 36, or the left hand plunger 92 contacting the bottom of the corresponding pocket 96 and acting through the corresponding plunger 90 limits further movement of the piston valve 78 in such direction. In the particular construction shown in Figs. 1, 2 and 3 the collars 84 in one instance and the plungers 90 and 92 in the other instance are so proportioned that either may be employed for this purpose. Furthermore, because of the fact that in the movement of the piston valve 78 from the position indicated in Fig. 1 to the position indicated in Fig. 2 the piston valve 78 moves out of engagement with the right hand collar 84 and the right hand plunger 90 moves to the left out of engagement with the right hand plunger 92, the fluid pressure acting on the outer faces of the right hand collar 84 and right hand plunger 92 may be relieved without affecting the operation.

As will be apparent, if it is desired to shift the piston valve 78 from the extreme left hand limit of its movable position illustrated in Fig. 2 to the extreme limit of its movable position to the right, then the application and release of pressure to the corresponding parts 84, 90 and 92 but at the opposite end of the valve 30 to that described in connection with Fig. 2 will effect such movement.

Should it be desired to move the piston valve 78 from the position indicated in Fig. 2 to the position indicated in Fig. 3, then all that will be required in addition to that described in connection with Fig. 2 is to introduce fluid under pressure to the outer face of the left hand collar 84 where, because of the fact that it is assumed that the same unit pressure is applied or is capable of being applied to the outer faces of all members 84, 90 and 92, and because of the larger area of the left hand collar 84 exposed to such pressure as compared to the exposed area of the right hand plunger 90, the left hand collar 84 will be shifted to the right or axially inwardly and will force the piston valve 78 and right hand plunger 90 to the right until the left hand collar 84 abuts against the corresponding end of the sleeve 56, which will thereby limit further movement of the left hand collar 84 to the right and will locate the piston valve 78 in a position corresponding to that illustrated in Fig. 3. In this movement of the parts it is, of course, assumed that fluid pressure is relieved on the outer faces of the left hand plunger 92 and relieved from the outer face of the left hand plunger 90, although the application of pressure to the outer faces of the right hand collar 84 and/or right hand plunger 92 would have no effect upon the movement described. It will, of course, be obvious that the piston valve 78 would be shifted to the position indicated in Fig. 3 from the position indicated in Fig. 1 if fluid under pressure was admitted to the same faces of the same other members as just described. It will also be understood that if it is desired to shift the piston valve 78 to a position corresponding to the position shown in Fig. 3 but to the right of its central or neutral position instead of to the left as shown in Fig. 3, the application of and release of pressure to corresponding members at the opposite ends of the valve 30 would effect such movement.

Thus it will be understood that by suitable application and release of fluid under pressure to and from the outer faces of the collars 84 and plungers 90 and 92 in the construction described the piston valve 78 may be caused to assume any one of five different positions corresponding to the four operative and one neutral position of the piston valve 78 first described as being necessary to control the direction and speed of movement of the piston 16 and slide 10, or to cause the same to remain stationary. At the same time it will be recognized that by the construction described and particularly by use of the collars 84 within which the plungers 90 are reciprocable, it is possible to build such a valve device of simplified construction and of minimum over-all length.

As has been previously mentioned while any suitable source of fluid under pressure may be employed for actuating the members 84, 90 and 92, in view of the fact that a source of fluid under pressure must be provided in any case for actuating the hydraulic motor 12 it will ordinarily be found more convenient to employ the same source of pressure for actuating the members 84, 90 and 92, and accordingly this is indicated in the drawings. Furthermore, with the information thus far given it will be understood that it will ordinarily be within the province of the ordinary workman skilled in the art to construct suitable pilot valves for controlling the application of or release of pressure to the various members 84, 90 and 92 to control the position of the piston valve 78 in accordance with the desired amount, direction and speed of operation of the hydraulic motor and parts to be actuated thereby. One form of such pilot valve arrangement is indicated in Fig. 1 and the arrangement shown involves certain additional features of novelty. This pilot valve arrangement includes four separate valve structures, namely those indicated generally at 100, 102, 104 and 106. All of these auxiliary or pilot valve structures are connected to the pressure side of the pump 26 by means of a duct 108 and corresponding branches therefrom and likewise all are connected to the tank or sump 22 for discharge or release purposes by means of a duct 110. The particular type of valve employed for the pilot valves is more or less immaterial, but for the purpose of illustration only the valve 100 is shown as of the oscillating type and the valves 102 to 106, inclusive, as of the piston valve type. Each of these latter valves is provided with a projecting plunger through which its corresponding piston valve may be actuated in one direction.

The pilot valve 102 is provided for controlling the stopping and starting of the hydraulic motor 12 respectively by the simultaneous application of pressure to both pockets 96 thereby holding the piston valve 78 in the neutral position or by the simultaneous release of pressure from both pockets 96 in the latter instance thereby permitting pressure applied to the collars 84 and plungers 90 to effect movement of the piston valve 78 into any one of the desired operative positions. A branch conduit 112 communicating with both pockets 96 of the valve 30 is connected into the body of the pilot valve 102 intermediate the points of connection of the conduits 108 and 110 therewith. Movement of the valve member 114 of the pilot valve 102 to its uppermost position connects both pockets 96 through conduit 112 to the conduit 110 leading to the tank 22. When the movable valve member 114 is at the bottom limit of its movable position substantially as indicated in Fig. 1, then the member 114 communicates the source of pressure through the duct 108 with the duct 112 and consequently both pockets 96, and thereupon causes the plungers 92 to move inwardly and centralize the piston valve 78 in the valve 30 so as to prevent movement of the hydraulic motor 12 and slide 10.

The valve 100 is provided for controlling the direction of movement of the piston 16 in the hydraulic motor 12 and the slide 10 by selectively controlling the application of fluid under pressure to the outer end of either of the plungers 90 in the valve 30. For this reason it is connected to a duct 120 communicating with the axially outer face of the right hand plunger 90 and another duct 122 communicating with the axially outer face of the left hand plunger 90. As previously described in the absence of fluid under pressure in both of the pockets 96 of the valve 30, application of pressure to the axially outer face of the right hand plunger 90 only will cause movement of the piston 16 and slide 10 to the right, and application to the axially outer end of the left hand plunger 90 will cause movement of the piston 16 and slide 10 to the left as viewed in the drawings. In the present instance the pilot valve 100 is shown as being provided with a control arm 124 connected by a link 126 with a lever 128 which may be actuated to place the pilot valve 100 in a position to effect movement of the piston 16 of the hydraulic motor 12 in either direction.

The control arm 124 and lever 128 are actuated by dogs 501 and 502 respectively, attached to the slide 10.

The pilot valves 104 and 106 are identical in construction and are provided for controlling the rate of movement of the piston 16 and slide 10. For this purpose a conduit 130 communicates with the bore of the body for the valve 104 intermediate the point of connection of the ducts 108 and 110 therewith and at its opposite end the duct 130 communicates with the axially outer face of the right hand collar 84. A similar conduit 132 connects the pilot valve 106 with the axially outer face of the left hand collar 84. When the movable piston valve members 134 of the valves 104 and 106 are at the upper limits of their movable position toward which they are constantly urged by means of corresponding springs 136, the pressure conduit 108 is cut off through the valves 104 and 106 from the discharge ducts 110 and the ducts 130 and 132 respectively, and the ducts 130 and 132 communicate through the valves 104 and 106 with the discharge duct 110. In such circumstances any pressure acting upon the outer faces of the collars 84 is relieved by being communicated with the atmosphere through the duct 110 and sump or tank 22. As previously described, the collars 84 are provided for the purpose of limiting axial movement of the piston valve 78 in the valve device 30 to the position indicated in Fig. 3, or the corresponding position on the opposite side of center, and in such position restricts the discharge of liquid from that end of the cylinder 14 toward which the piston 16 is moving so as to effect a feeding movement of the slide 10 as differentiated from a traverse or rapid feed movement thereof. Accordingly, by depressing the movable valve member 134 of either of the pilot valves 104 or 106, depending upon the direction of movement of the piston 16 and slide 10 as controlled by the valve 100, the rate of movement of the slide 10 may be reduced to a desired amount, as controlled by the restricting means 70, for feeding or other purposes.

It will be recognized that it will usually be desirable to reduce the speed of operation of the slide 10 during limited positions of movement only of the slide 10 and for a limited distance only and to permit it to move at its maximum rate at all other times, this for the purpose of speeding up the operation to be performed. To enable this to be accomplished cam members or fingers such as 140 may be shiftably secured to the slide 10 in a position to engage and depress the corresponding plungers of the pilot valves 104 and 106 against the force of their corresponding springs 136 in accordance with the particular position of the slide at which it is desired to vary its rate of movement. These cam members 140 may have one or more extended portions such as 142 which, when the plunger of the corresponding pilot valve 104 or 106 is in contact therewith will hold the corresponding pilot valve in fully depressed position so as to effect the corresponding feeding movement of the slide 10, and the length of such portions 142 measured in the direction of movement of the slide 10 will determine the extent of movement of the slide 10 during such feeding movement. Obviously the cam members 140 may be provided with any desired number of portions 142 each varying in the above described lengths, if necessary, to accommodate it to any desired and predetermined feeding condition of the slide 10. In the construction shown one of the cam members 140 controls the feeding periods of the slide 10 when moving in one direction and the other when feeding in the opposite direction.

In order to enable the slide 10 to be automatically stopped at a definite position in its sliding movement a bracket member 144 may be adjustably secured to the slide 10 in a desired longitudinal position thereon, such as that shown, corresponding to the point at which it is desired to stop the movement of the slide. It will be understood that cam members 140 and bracket 144 are not in alignment in the direction of movement of the slide 10 so that there will be no possibility of the bracket 144 or parts operated thereby interfering with the pilot valves 104 and 106. In the particular construction shown a dog 146 is pivotally secured to the bracket 144 and normally depends therefrom under the force of gravity in a position to engage the plunger 148 of the pilot valve 102 when moving past the same. A stop 150 is provided for limiting the pivotal movement of the dog 146 in one direction. With this construction when movement of the slide 10 to the right brings the dog 146 into contact with the plunger 148 the dog 146 pivots until it contacts with the stop 150 and thereafter continued movement of the slide 10 and resulting co-action between the dog 146 and the plunger 148 forces the plunger 148 downwardly toward the position shown in Fig. 1. Preferably means are provided for drawing the plunger 148 downwardly to its lower limit of movement once it is moved to approximately that position so that when moved to such position it will free itself of contact with the dog 146 and permit the dog 146 to swing to its normal position under the force of gravity, thereby placing it out of interfering relation to subsequent upward movement of the plunger 148 to again institute movement of the slide 10. This means may take the form of a notch such as 152 formed in the surface of the plunger 148 and a cooperating spring pressed detent 154.

In order to return the pilot valve 102 to its normal position with the plunger 148 in raised position, manually controlled means are provided in the form of a vertically movable rod 156 extending through the bottom of the valve 102 and into engagement with the movable valve member 114 thereof, and in turn connected through a bell-crank 158 and link 159 with a manually controllable lever 159'. If it is desired to enable the lever 159' to stop operation of the slide 10 at any desired point, the rod 156 may be secured to the valve member 114 to enable this to be accomplished.

Figure 4:
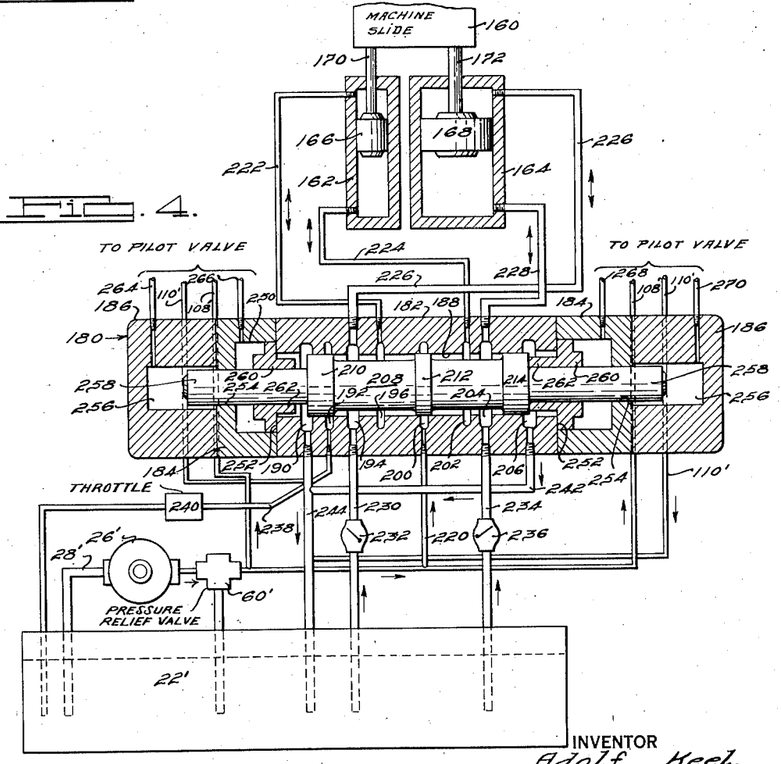
Fig. 4 is a view similar to Fig. 1 but illustrating a hydraulic motor including two cylinders of different diameters together with a control valve therefor of slightly different construction than that illustrated in the preceding views.
Figure 5:
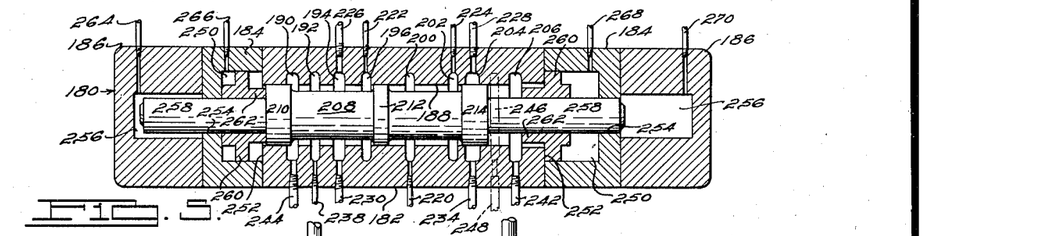
Fig. 5 is a sectional view taken centrally through the control valve illustrated in Fig. 4 and showing the same in a different position of operation.

In the modified form of construction illustrated in Figs. 4 and 5 the part to be actuated by the hydraulic motor is illustrated as a machine slide 160 and corresponds to the slide 10 in the previous figures. The hydraulic motor for moving the slide 160 comprises in this case two cylinders 162 and 164 having pistons 166 and 168 respectively. The respective rods 170 and 172 are both connected to the slide 160. A liquid tank or sump 22' from which a pump 26' obtains liquid by the suction pipe 28' and having a cooperating pressure release valve 60', corresponding to the parts 22, 26, 28 and 60 previously described, is employed in this modification. Considering the pump 26' to have a constant pumping capacity at a constant pressure it will be apparent that if the pump 26' is connected to deliver its entire capacity to the cylinder 162 only, the piston 166 and consequently the slide 160 will be caused to move at a relatively rapid rate, whereas if the output of the pump 26' is connected to discharge into both of the cylinders 162 and 164 the pistons 166 and 168, because of their relatively large combined area, will be moved at a relatively slower rate which may, particularly when the discharge therefrom is suitably restricted, correspond with that desired for a feeding movement of the slide 160. Briefly stated, this is the principle of operation of the modification shown in Figs. 4 and 5.

In order to control the application of pressure from the discharge side of the pump 26' to the cylinders 162 and 164 in the manner described and in order to control the flow of the liquid discharged from these cylinders, a valve mechanism indicated generally at 180 and of a construction generally similar to the valve 30 previously described, is employed. The valve 180 includes a central body portion 182 at each end of which is suitably secured a member 184 to each of which in turn is secured an end or cap member 186. The body 182 is provided with a central bore 188 in which are formed in axially spaced relation with respect to the length of the bore, a plurality of annular grooves or pockets 190, 192, 194, 196, 200, 204, and 206, which are similar to the pockets 42 to 54, inclusive, in the previously described construction. Instead of providing a sleeve in the bore 188 in a manner similar to that in the previously described construction such sleeve is eliminated and the piston valve indicated generally at 208 is received directly in the bore 188. The piston valve 208 is provided with three piston portions 210, 212 and 214 of a diameter to be closely received within the bore 188 so as to prevent the flow of fluid axially thereof, and the surface of the piston valve 208 is radially relieved between the said portions as indicated to permit flow axially along such relieved portions within the bore 188.

The discharge side of the pump 26' is connected by the duct 220 with the groove or pocket 200. The grooves or pockets 196 and 202 immediately to the left and to the right respectively of the pocket 200 are connected by the ducts 222 and 224 respectively with the respective opposite ends of the cylinder 162. The groove or pocket 194 immediately to the left of the pocket 196 is connected by the duct 226 with the end of the cylinder 164 corresponding to that end of the cylinder 162 to which the duct 222 is connected. The pocket 204 immediately to the right of the pocket 202 is connected by a duct 228 to the end of the cylinder 164 opposite to that to which the duct 226 is connected. The pocket 194 is also connected by a duct 230 with the sump 22', a check valve 232 being interposed in this duct to permit the flow of fluid therethrough only in the direction from the sump 22' towards the valve 180. The pocket 204 is provided with a duct 234 and check valve 236 corresponding to the duct 230 and check valve 232. The pocket 192 is connected to the tank or sump 22' by means of a duct 238 in which is interposed a flow restricting device 240 which may be of the type illustrated at 70 in the previously described construction or may be of any other suitable type. The opposite end pockets 190 and 206 are connected together and to the sump 22' by means of the unrestricted ducts 242 and 244.

With the construction as thus far described and considering for the moment that the ends of the main body portion 182 of the valve 180 are closed against the escape of fluid therefrom, it will be noted that when the piston valve 208 is in its central position indicated in Fig. 4 the piston portion 212 seals the pocket 200 against the flow of liquid under pressure into the bore 188, and all paths of discharge of liquid from the cylinders 162 and 164 to the sump 22' are blocked by the piston portions 210 and 214 and consequently the pistons 166 and 168 and the slide 160 are maintained against movement.

If the piston valve 208 should be shifted from its neutral or central position illustrated in Fig. 4 to the extreme limit of its movement to the left as viewed in that figure, it will assume the position illustrated in Fig. 5. In such case the liquid under pressure flowing from the pump 26' through the duct 220 to the pocket 200 will be permitted to flow axially of the piston valve 208 between the portions 212 and 214 and consequently will flow into the pocket 202 and out through the duct 224 to the bottom end of the cylinder 162, but inasmuch as the portion 214 of the piston valve 208 in such position closes the pocket 204, this liquid under pressure from the pump 26' will not be permitted to flow into the pocket 204 and consequently no fluid under pressure will be fed to the lower end of the cylinder 164.

The piston valve 208 in thus moving to its extreme position of movement to the left as viewed in Fig. 5 will cause the portion 210 thereof to move sufficiently to communicate all of the pockets 190, 192, 194 and 196 through the reduced portion of the valve 208 intermediate the portions 210 and 212 thereof. Accordingly, upward movement of the piston 166 in the cylinder 162 will displace liquid from above the piston 166 through the duct 222 into the pocket 196 and thence into the bore 188 of the main body portion 182 from which it may flow into both pockets 190 and 192 and thence through the ducts 244 and 238 respectively to the sump 22'. In such case, of course, the duct 238 being restricted by the device 240 the greater volume of such liquid will flow into the sump 22' through the duct 244. Likewise the liquid displaced from the cylinder 164 above the piston 168 during upward movement of the piston 166 will flow out through the duct 226 into the pocket 194 and thence along the bore 188 to the pockets 190 and 192 and be discharged to the sump 22' in the same manner as above described.

Inasmuch as upward movement of the pistons 166 and 168 in the manner described can only be accomplished if the resulting suction below the piston 168 is relieved, means must be provided for permitting this. It will be observed that when the piston valve 208 is in the position shown in Fig. 5, although the portion 214 thereof prevents the transmission of fluid under pressure between the pockets 200 and 204, the duct 228 which connects the pocket 204 the lower end of the cylinder 164 is also connected by the duct 234 with the sump 22' through the check valve 236. In view of the fact that the check valve 236 permits flow of liquid therethrough in the direction of the pocket 204 but prevents flow of liquid therethrough from the pocket 204 to the sump 22', the suction created under the piston 168 in moving upwardly will be transmitted through the duct 228, pocket 204 and duct 234 to the sump 22' and liquid will flow upwardly through these ducts and through the pocket 204 past the check valve 236 and into the cylinder 164 below the piston 168 so as to allow the piston 168 to freely move upwardly without any material resistance due to suction on its lower face. Accordingly with the valve in the position illustrated in Fig. 5 the full capacity of the pump 26' will be delivered to the lower end of the cylinder 162 as viewed in the drawings, the liquid above both pistons 166 and 168 will be permitted to be discharged from the respective cylinders 162 and 164 without any material restriction, and liquid from the sump 22' will be allowed to flow freely to the lower end of the cylinder 164. Consequently the slide 160 will be moved upwardly, as viewed in the drawings, at a maximum rate of speed.

If the piston valve 208 instead of being moved to its extreme position of movement to the left as viewed in Fig. 5 is moved to a corresponding position to the right then the pump 26' will be connected through the duct 220 and pocket 200 with the pocket 196 and through the duct 222 with the upper end of the cylinder 162, and the pockets 202, 204 and 206 will be opened to each other. In such case the liquid discharged from the cylinders 162 and 164 below the pistons 166 and 168 respectively will flow through the ducts 224 and 228 respectively into the bore 188 and through the pocket 206 and ducts 242 and 244 back to the sump 22'. The pocket 194 being closed by the portion 210 of the piston valve 208 in such instance, the liquid required to relieve suction above the piston 168 in its downward movement will be drawn from the sump 22' through the duct 230 past the check valve 232 and through the pocket 194 around the portion 210 of the valve 208 through the duct 226 to the upper end of the cylinder 164 to relieve suction above the piston 168 in a manner substantially similar to that previously described. Thus with the piston valve 208 in either its extreme positions of movement to the left and to the right respectively, the slide 160 will be caused to move at a maximum rate of speed in an upward and downward direction respectively as viewed in the drawings.

Should the piston valve 208 be moved from its neutral position illustrated in Fig. 4 to the left less than that illustrated in Fig. 5 and to an extent sufficient only to communicate the pockets 200, 202 and 204 as a group and also the pockets 192, 194 and 196 as another group with each other, but with the valve 208 in such a position that the portion 210 thereof shuts off the pocket 190 from communication with any other pocket, then liquid under pressure from the pump 26' will flow from the pocket 200 into both pockets 202 and 204 and through the ducts 224 and 228 respectively to the lower ends of both cylinders 162 and 164, to force the pistons 166 and 168 respectively therein upwardly. The liquid displaced from the upper ends of the cylinders 162 and 164 by the upward movement of the corresponding pistons 166 and 168 will be forced through the ducts 222 and 226 respectively into their respective pockets 196 and 194 and into the bore 188 of the main body member 182 where it may flow axially thereof to the pocket 192, but not to the pocket 190 as the latter is now closed under the conditions mentioned by the portion 210 of the valve 208. Such liquid from the pockets 194 and 196 in flowing into the pocket 192 will be discharged through the duct 238 only to the sump or tank 22' but in so being discharged to the sump will pass through the restricting device 240 which will limit the rate of flow thereof to an extent sufficient to reduce the speed of movement of the pistons 166 and 168, and consequently the slide 160 to that desired for feeding or other slow movement purposes.

In the particular embodiments of the invention illustrated in full lines in Figs. 4 and 5 there is no position of the piston valve 208 corresponding to the last mentioned intermediate position of the piston valve 208 to the right of its neutral position as just described, and consequently while the valve 180 is capable of causing movement of the slide 160 at a maximum rate of speed in either direction it is capable of reducing its speed below maximum as for feeding or other purposes in one direction only. It will be apparent, however, that should it be desired to employ the construction illustrated in Figs. 4 and 5 so as to permit feeding movement in both directions of movement of the slide 160, all that would be required is the addition of an additional pocket such as indicated at 246 by dotted lines in Fig. 5 on the right hand end of the body member 182 in the bore thereof between the pockets 204 and 206, corresponding to the pocket 192 on the left hand side, and connecting such added pocket to the duct 238 by suitable means such as the duct indicated at 248 by dotted lines.

In order to cause the above described movements of the piston valve 208 to obtain the above described movements of the slide 160, the following construction is provided. The body members 184 are each provided wtih a recess 250 co-axial with the bore 188 of the main body member 182 and opening into the bore 188. The diameter of the recesses 250 are greater than the diameter of the bore 188 so as to form a shoulder 252 at the plane of junction between them. From the bottom of each of the recesses 250 a bore 254 extends through the outer end of each of the corresponding members 184. The bores 254 are considerably smaller in diameter than the bores 250 but are co-axial therewith and with the bore 188 of the main body portion 182. The axially inner face of each of the end body members 186 is provided with a blind pocket 256 opening onto the corresponding bore 254 and of slightly larger diameter than such bore.

Axially, slidably received in each of the bores 254 is an elongated plunger 258, and while in the broader aspects of the invention it makes no particular difference whether the plungers 258 are formed integrally with or separate from the piston valve 208, as a matter of illustration they are shown integral therewith. In each of the recesses 250 a piston in the form of a ring or collar 260 is axially slidably received and through which the corresponding plunger 258 projects in axially slidable relation with respect thereto. Each of the rings or collars 260 is provided with an axially inwardly projecting hub portion 262 adapted, as will hereinafter be more fully explained, to abut against the corresponding end of the piston valve 208 at the shoulder formed by the junction of the corresponding plunger 258 and such end. It may be noted, however, that in the particular embodiment illustrated in Figs. 4 and 5 the hub portion 262 for the right hand collar 260 is of greater length than that on the left hand collar so as to enable it to project further into the bore 188.

Ducts 264 to 270, inclusive, are provided for introducing fluid under pressure to or releasing fluid under pressure from the left hand pocket 256, left hand recess 250, right hand recess 250 and right hand pocket 256 respectively at the axially outer end of each of these.

From the above it will be understood that if fluid under pressure is admitted to the left hand pocket 256 through the duct 264 it will tend to move the valve 208 to the right as viewed in the figures, and if at the same time fluid pressure is admitted to the right hand recess 250 through the duct 268 the right hand collar 260 will be moved to the limit of its travel to the left against the corresponding shoulder 252 and thereby limit movement of the piston valve 208 to the right, thus positioning the piston valve 208 in its neutral position indicated in Fig. 4. At the same time fluid under pressure will be released from the left hand recess 250 and right hand pocket 256 through the ducts 266 and 270 respectively. If it should be desired to move the piston valve 208 to the position indicated in Fig. 5, then fluid under pressure may be admitted to the right hand pocket 256 through the duct 270 and fluid under pressure released from the left hand pocket 256 and from both the left and right hand recesses 250 through the ducts 264, 266 and 268 respectively, upon the occurrence of which the fluid under pressure in the right hand pocket 256 will move the valve 208 to the left until the left hand collar 260 seats in the bottom of its corresponding recess 250 and engages the portion 210 of the valve 208 to limit further movement of the valve to the left. If now the pressure in the right hand pocket 256 is relieved and fluid under pressure is admitted through the duct 264 to the left hand pocket 256, the piston valve 208 will move from the position indicated in Fig. 5 to the opposite extremity of its movement to the right, in which position the right hand collar 260 will abut against the bottom or right hand face of the corresponding recess 250 and the portion 214 of the valve 208 will abut against the axially inner end of its hub portion 262 to limit further movement in this direction. In such an event the slide 160 will be caused to move downwardly as viewed in Fig. 4 at a maximum rate of speed as previously described.

If it is desired to move the slide 160 upwardly at a relatively slow or feeding rate, then fluid under pressure is admitted to the left hand recess 250 through the duct 266, to the right hand pocket 256 through the duct 270, and relieved from the left hand pocket 256 and right hand recess 250 through the ducts 264 and 268 respectively. Thus the left hand collar 260 will move to the position indicated in Fig. 4 and the pressure in the right hand pocket 256 will move the valve 208 to the left until the portion 210 thereof contacts with the hub 262 of the left hand collar 260. In such an event, as previously described, the slide 160 will be caused to move upwardly as viewed in Fig. 4 and the liquid being discharged from the upper ends of the cylinders 162 and 164 will be caused to pass through the metering device 240 in flowing to the sump 22', thus restricting the speed of the slide 160. These four positions are all the positions that the valve 180 shown in Figs. 4 and 5 is capable of assuming, although as will be understood if the pocket 246 and duct 248 indicated in dotted lines in Fig. 5 are found desirable and are provided, then a position of the valve 208 equivalent to that last described but to the opposite side of its central or neutral position might be obtained by admitting fluid under pressure to the left hand pocket 256 and right hand recess 250 and simultaneously relieving the pressure in the remaining pocket and recess. In such an event the slide 160 would be moved downwardly at a relatively slow or feeding rate, the liquid discharged from below the pistons therein being forced through the restricting device 240 as previously described, or as an alternative, it may be forced through another restricting device similar to 240 that may be added in the duct 248, thus in the latter case the feed in opposite directions would, therefore, be independently adjustable. When feed in both directions is desired it will be necessary to add plungers similar to 92, previously described, in order to provide a neutral stop position for the piston valve member 208.

No pilot valve mechanism is shown in Figs. 4 and 5 for controlling the flow of fluid under pressure to or release of fluid under pressure from the pockets 256 and recesses 250, it being understood that a pilot valve mechanism of the general type illustrated in Fig. 1 or any other suitable type might be connected with the ducts 264 to 270, inclusive, to permit the desired control of the positions of the plungers 258 and 260.

Figure 6:
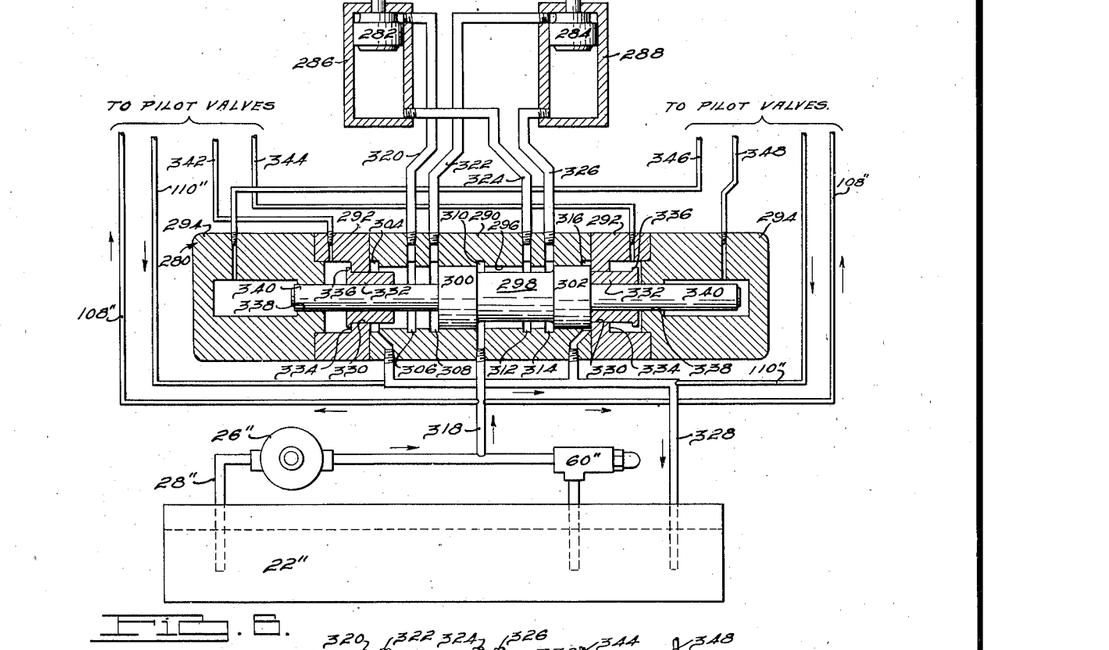
Fig. 6 is a view similar to Fig. 1 but illustrating two hydraulic motors and a still different modification of the control valve therefor.
Figure 7:
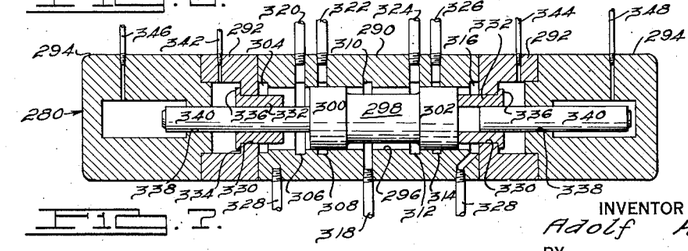
Fig. 7 is a sectional view taken centrally through the control valve shown in Fig. 6 but showing the same in different position of operation.

In Figs. 6 and 7 a modified form of valve structure 280 is shown connected to two independently movable pistons 282 and 284 having corresponding cylinders 286 and 288 respectively. Such independently movable pistons may be found useful in various instances, as an example where it is desired to locate a part to be machined by the movement of one piston and to clamp such part in located position by movement of the other piston. For the sake of convenience the cylinders 286 and 288 are shown vertically disposed in the drawing, it being understood that they may assume any desirable position in actual practice. Accordingly it will be understood that in this modification, where used with two separate cylinders for purposes such as described, the valve 280 will be employed for moving either one or the other of the pistons 282 and 284, or both, to either limit of their movement without the necessity of restricting the speed of either one or the other as would be required if one or the other piston was connected to a slide requiring movement of a feeding nature, and furthermore in this modification there will be no need of stopping either one or the other of the pistons at any position intermediate its opposite operative limit of movement.

In this construction a sump 22" for a liquid supply, a pump 26" having an intake 28" and being provided with a pressure release valve 60" on the discharge side of the pump, corresponding to the parts 22, 26, 28 and 60 described in connection with Fig. 1, are similarly provided.

The valve 280 comprises a main central body portion 290, and members 292 abutting the ends thereof, and outer end members 294, the whole being suitably secured together in a manner not shown. The central body portion 290 is provided with a central bore 296 within which is axially slidably received a piston valve indicated generally at 298 having opposite end piston portions 300 and 302 respectively relatively closely fitting the bore 296, the piston being radially relieved between these portions. The bore 296 is provided with seven axially spaced annular grooves or pockets 304 to 316 inclusive. The pressure side of the pump 26" is connected by means of a duct 318 to the central pocket 310. Ducts 320 and 322 communicate respectively with the pockets 306 and 308 immediately to the left of the central pocket 310 and at their opposite ends communicate with the upper ends of the cylinders 286 and 288 respectively. The pockets 312 and 314 immediately to the right of the central pocket 310 are communicated through the ducts 324 and 326 with the lower ends of the cylinders 286 and 288 respectively. The outer pockets 304 and 316 communicate with the atmosphere through the duct 328 discharging into the sump 22".

Considering for the moment that the ends of the main body portion 290 are sealed against the escape of fluid therefrom and assuming the piston valve 298 to be in the position indicated in Fig. 6, it will be apparent that fluid under pressure delivered from the pump 26" through the duct 318 to the pocket 310 will flow along the central portion of the valves 298 to the right and will be discharged through the pockets 312 and 314 and their respective ducts 324 and 326 to the lower ends of the cylinders 286 and 288 respectively, thus forcing the corresponding pistons 282 and 284 upwardly and/or holding such pistons in their upper limit of movement. Such liquid as is forced from the upper ends of the cylinders 286 and 288 by upward movement of the corresponding pistons 282 and 284 is discharged through the ducts 320 and 322 respectively into the pockets 306 and 308 respectively and thence through the bore 296 of the main body portion 290 into the pocket 304 and thence through the ducts 328 to the sump 22'.

If now the piston 298 is moved to a corresponding position to the left of its central position in the bore 296 the pocket 310 will then be communicated with the pockets 306 and 308 and the pockets 312 and 314 will be communicated with the pocket 316 whereupon fluid under pressure from the pump 26' will be fed through the ducts 320 and 322 to the upper ends of the cylinders 286 and 288 respectively, forcing the pistons 282 and 284 downwardly, the liquid displaced under such pistons by this movement being forced through the ducts 324 and 326 respectively through the bore 296 to the pocket 316 and thence to the sump 22" through the duct 328. Thus in either of the two described positions of the piston valve 298, both pistons 282 and 284 will be forced to the upper and lower limits respectively of their movable positions.

If the piston 298, instead of being shifted to the extreme limit of its movement to the right as viewed in Fig. 6, is moved only to an intermediate position in the same direction, as viewed in Fig. 7, and in which position the portion 300 blocks the pocket 308 and the portion 302 blocks the pocket 314, then fluid under pressure from the pump 26" in flowing into the bore 296 to the duct 318 and pocket 310 will communicate only with the pocket 312 and through it finds its way through the duct 324 to the lower end of the cylinder 286 only, thus tending to force only the piston 282 upwardly. The liquid discharged from the upper end of the cylinder 286 by this upward movement of the piston 282 will flow downwardly through the duct 320 and through the pocket 306 and bore 296 into the pocket 304 and thence through the duct 328 to the sump 22". The pockets 308 and 314 being blocked by the portions 300 and 302 respectively of the piston valve 298, no flow of fluid will occur either to or from the cylinder 288 and accordingly the piston 284 therein will remain stationary.

If, on the other hand, the piston 298 is shifted to the left an amount corresponding to that shown in Fig. 7 to the right of its central position, then fluid under pressure from the pump 26" will be forced through the duct 322 to the upper end of the cylinder 288 and the liquid discharged below it through the duct 326 will pass through the pocket 316 and duct 328 to the sump 22", causing the piston 284 to move downwardly. At the same time the pockets 306 and 312 communicating through the ducts 320 and 324 with the opposite ends of the cylinder 286 will be blocked and no movement of the piston 282 will occur.

Accordingly with this valve structure connected to the cylinders 286 and 288 in the manner shown, positioning of the piston valve 298 as indicated in Fig. 7 will cause the left hand piston 282 to be advanced independently of the piston 284 and movement of the piston valve 298 to a corresponding position on the other side of its center will cause retraction of the piston 284 in advance of the piston 282. It will thus be understood that if the pistons 282 and 284 are in their lowermost positions and the piston valve 298 is moved to the position indicated in Fig. 7, the piston 282 will be moved to the upper limit of its stroke without a corresponding movement of the piston 284 and then as the piston valve 298 is shifted to the position indicated in Fig. 6 the piston 284 will then be shifted to a position corresponding with the position of the piston 282. Subsequent movement of the piston valve 298 to a position corresponding to that shown in Fig. 7 but to the left of its central position instead of to the right as shown, will then effect a retraction of the piston 284 without a corresponding movement of the piston 282, and subsequent movement of the piston valve 298 to its extreme position of movement to the left, corresponding to but opposite to that position indicated in Fig. 6, will cause a subsequent like movement of the piston 282.

From the above it will be understood that by the arrangement illustrated in Figs. 6 and 7 where the movement of the pistons 282 and 284 are employed for the purpose suggested above as an example, movement of the piston 282 may be employed for controlling the locating device and the movement of the piston 284 for controlling the movement of the clamping device, and consequently it will be possible by suitable movement of the valve 298 to first move the piston 282 to locate a part to be worked upon, causing the subsequent movement of the part 284 to clamp the part to be worked upon in located place and after the part has been machined or otherwise suitably worked upon it may be first unclamped by movement of the piston 284 and then released from located position by subsequent movement of the piston 282.

In order to control the piston valve 298 in the various positions of movement above described the members 292 are provided with bores 330 in which collars or rings 332 similar to the collars 84 and 260 previously described are axially slidably received. The outer ends of the bores 330 are enlarged to provide shoulders 334 for engagement with the outer ends of the flanges 336 on the collars 332 to limit axially inward movement thereof. The outer end members 294 are provided with suitable bores 338 within each of which and the central opening of the corresponding collar 332 a plunger 340 is axially slidably received. Ducts 342 and 344 are provided for admitting fluid under pressure to or relieving fluid under pressure from the axially outer ends of the bores 330 and ducts 346 and 348 are provided for introducing fluid under pressure to or relieving fluid under pressure from the axial outer ends of the bores 338.

By admitting fluid under pressure through the duct 346 to the left hand bore 338 and relieving fluid under pressure from the bores 330 and right hand bore 338 through the ducts 342, 344 and 348 respectively, the left hand plunger 340 is permitted to force the piston valve 298 to the position indicated in Fig. 1 in which position both pistons 282 and 284 are moved to the upper limit of their travel. Similarly, application of fluid under pressure to the right hand bore 338 and relief of pressure in the left hand bore 338 and both bores 330 will permit the right hand plunger 340 to force the piston valve 298 to its extreme position of movement to the left as viewed in Fig. 6, in which case fluid under pressure is admitted to the upper ends of both the cylinders 286 and 288 and both pistons 282 and 284 respectively are forced to the lower limit of their movable positions.

Admission of fluid under pressure through the duct 346 to the left hand bore 338, release of pressure in the right hand bore 338 through the duct 348, application of pressure to the right hand bore 330 through the duct 334, and if desired, although not necessary, release of pressure in the left hand bore 330 through the duct 342, will force the collar 332 at the right hand end of the valve 280 to its axially inner position and thereby limit the movement of the valve 298 under the influence of the left hand plunger 340 to the intermediate position to the right as viewed in Fig. 7 so that the piston 282 only will be moved to the upper or outer end of its stroke. Likewise if fluid under pressure is admitted to the left hand bore 330, relieved in the right hand bore 330, admitted in the right hand bore 338 and relieved in the left hand bore 338, the valve 298 will be shifted to the left of its center position to a position corresponding to the position shown in Fig. 7 to the right, and in such case the piston 284 will be caused to move downwardly independently of corresponding movement of the piston 282 as previously described.

No pilot valves for controlling the admission of fluid under pressure to or the release of fluid under pressure from the various bores through the ducts 342 to 348, inclusive, is illustrated in Figs. 6 and 7 and any suitable valve or valves may be employed for this purpose.

From the foregoing it will be understood that in the broader aspects of the invention valves such as indicated generally at 30, 180 and 280 respectively may be employed for causing the specific movement of the hydraulic motors disclosed as described and also that their points of connection with these hydraulic motors may be varied to obtain any desired direction of movement, rate of movement, or sequence of operation desired, or may be connected to one or more hydraulic motors of any desirable type to obtain any direction, rate and/or sequence of operation that may be found necessary or desirable in any particular instance. In a more limited sense the invention includes certain more limited applications of the broad invention as included in the above description.

Accordingly it will be understood that formal changes may be made in the specific embodiments of the inventions described without departing from the spirit and substance of the broad inventions, the scope of which is commensurate with the appended claims.

What I claim is:

1. In an apparatus of the kind described, a casing having a bore formed axially therethrough, a hydraulically actuated valve adapted to fit and slide in said bore, an opening in line with said bore, a collar in said opening having a limited capability of movement adapted to determine the travel of said valve, a plunger extending through said collar and adapted to reciprocate with reference thereto contacting said valve and adapted to be actuated by fluid pressure, and means for supplying a fluid pressure to said opening around said plunger and back of said collar, and a second fluid actuated plunger of limited movement adapted to dominate movement of the first named plunger and engaging the outer end of the same.

2. In an apparatus of the kind described, the combination of a casing having a bore, a valve adapted to fit and reciprocate therein, a plunger adapted to fit and reciprocate in said casing in the line of travel of said valve its inner end engaging said valve, a similar plunger similarly located at the other end of said valve and means for applying a fluid actuating pressure to each of said plungers and relieving the same whereby to enable said valve to be moved to either limit of its movable position, a plunger adapted to reciprocate with a limited movement in the line of travel of the first mentioned plungers contacting the outer end of each of said plungers, means for applying a dominating fluid pressure to each of said second mentioned plungers as respects said first mentioned plungers and relieving the same whereby to enable said valve to be centralized in said bore by application of fluid pressure to both the second mentioned plungers, a third pair of plunger means, one at each end of said valve and cooperating therewith to limit travel thereof in opposite directions under the influence of said first mentioned plungers to positions intermediate the central and extreme positions of travel of said valve, and means for admitting fluid under pressure to said third plunger means.

3. In a hydraulically operated valve with a piston type distributor slide, the combination of an actuating plunger, arranged on each side of the distributor slide for the purpose of moving it in an axial direction by applying hydraulic pressure upon their outer ends, with one stop collar with a definitely limited travel less than the travel of said slide, sliding inside of a cylinder bore formed in the valve housing, provided with a hole to permit one actuating plunger to slide through it, being of such diameter as to make its effective area greater than that of the actuating plunger on the opposite side of the distributor slide, and limiting the movement of the distributor slide by a distance equal to the travel of the stop collar when hydraulic pressure is applied upon the outer end of the collar.

4. In a hydraulically operated valve with a piston type distributor slide, the combination of two actuating plungers, one arranged on each side of the distributor slide for the purpose of moving it in axial direction by applying hydraulic pressure upon their outer ends, with two stop collars each with a definitely limited travel less than the travel of said slide, each sliding inside of a cylinder bore formed in the valve housing, each provided with a hole to permit one actuating plunger to slide through it, each being of such diameter as to make its effective area greater than that of the actuating plunger on the opposite side of the distributor side, and each limiting the movement of the distributor slide by a distance equal to the travel of the respective collar when pressure is applied upon the outer end of it.

5. In a hydraulically operated valve with a piston type distributor slide, the combination of two actuating plungers, one arranged on each side of the distributor slide for the purpose of moving it in an axial direction by applying hydraulic pressure upon their outer ends, with a stop collar with a definitely limited travel, sliding inside of a cylinder bore formed in the valve body, provided with a hole to permit one actuating plunger to slide through it, being of such diameter as to make its effective area greater than that of the actuating plunger on the opposite side of the distributor slide, and limiting the movement of the distributor slide by a distance equal to the travel of the stop collar when hydraulic pressure is applied upon the outer end of the latter; and a stop plunger with a definitely limited travel acting upon the outer end of the corresponding plunger, being of a diameter larger than that of the actuating plungers, and limiting by the distance of its travel the movement of the distributor slide when hydraulic pressure is applied upon the outer end of the stop plunger.

6. In a hydraulically operated valve with a piston type distributor slide, the combination of two actuating plungers, one arranged on each side of the distributor slide for the purpose of moving it in axial direction by applying hydraulic pressure upon their outer ends, with two stop collars, each with a definitely limited travel, each sliding inside of a cylinder bore formed in the valve housing, each provided with a hole to permit one actuating plunger to slide through it, each being of such diameter as to make its effective area greater than that of the actuating plunger on the opposite side of the distributor slide, and each limiting the movement of the distributor slide by a distance equal to the travel of the respective collar when pressure is applied upon the outer end of it, and with one stop plunger with a definitely limited travel, acting upon the outer end of one actuating plunger, being of a diameter larger than that of the actuating plungers, and limiting by the distance of its travel the movement of the distributor slide when hydraulic pressure is applied upon the outer end of the stop plunger.

7. In a hydraulically operated valve with a piston type distributor slide, the combination of two actuating plungers, one arranged on each side of the distributor slide for the purpose of moving it in axial direction by applying hydraulic pressure upon their outer ends, with two stop collars, each with a definitely limited travel, each sliding inside of a cylinder bore formed in the valve housing, each provided with a hole to permit one actuating plunger to slide through it, each being of such diameter as to make its effective area greater than that of the actuating plunger on the opposite side of the distributor slide, and each limiting the movement of the distribuor slide by a distance equal to the travel of the respective collar when pressure is applied upon the outer end of it, with two stop plungers, each with a definitely limited travel, each acting upon the outer end of one actuating plunger, each being of a diameter larger than that of the actuating plungers, and each limiting by the distance of its travel the movement of the distributor slide when hydraulic pressure is applied upon the outer end of the stop plungers.

8. In a hydraulically operated valve with a piston type distributor slide, the combination of two actuating plungers, one arranged on each side of the distributor slide for the purpose of moving it in axial direction by applying hydraulic pressure upon their outer ends, with one stop plunger with a definitely limited travel, acting upon the outer end of one actuating plunger, being of a diameter larger than that of the actuating plungers, and limiting by the distance of its travel the movement of the distributor slide when hydraulic pressure is applied upon the outer end of the stop plunger, and with two stop collars each with a definitely limited travel, each sliding inside of a cylinder bore formed in the valve housing, each provided with a hole to permit one actuating plunger to slide through it, each being of such diameter as to make its effective area greater than that of the actuating plunger on the opposite side of the distributor slide, and each limiting the movement of the distributor slide by a distance equal to the travel of the respective collar when pressure is applied upon the outer end of it.

9. A slidable member, a hydraulic motor for moving said member including a cylinder and piston reciprocable therein operatively connected to said slidable member for effecting equivalent relative movement thereof, a source of fluid under pressure, a valve device connected with said source and with said cylinder, a piston valve in said valve device, a pair of ducts connecting said valve device with each end of said cylinder, a flow restricting means in one duct of each of said pair of ducts, said valve device being so constructed and arranged that said piston valve may be moved to communicate said source with either of said pairs of ducts and the other pair of said pairs of said ducts with the atmosphere, and also may be moved to connect that one of either pair of said pairs of ducts not including said restricting device with said source and simultaneously connecting that one of the other pair of said pairs of ducts including said restricting means with the atmosphere, and also movable to a position to block both ducts of said pairs of ducts from both said source and from the atmosphere, a plunger at each end of said piston valve movable into contacting relation therewith, a stop plunger at the outer end of each of the first mentioned plungers and positioned to be engageable therewith, a collar surrounding each of said plungers and engageable with the corresponding end of said piston valve, and means for selectively applying fluid under pressure to the outer end of said plungers and collars including a pilot valve automatically operable to simultaneously admit fluid under pressure to the outer ends of both of said stop plungers, a pair of pilot valves automatically operable to admit fluid under pressure to the outer face of one of said stop collars and to the outer face of one of said first mentioned plungers at the opposite end of said piston valve, and a pilot valve for selectively admitting fluid under pressure to the outer end of either one of the first mentioned plungers.

10. In combination, a part to be moved, a hydraulic motor for moving said part including a pair of cylinders having pistons relatively reciprocable therein and connected to said part for causing corresponding relative movement thereof, a source of fluid under pressure, a valve device connected to said source, a duct independently connecting each end of said cylinder with said valve device, a pair of discharge ducts from said valve device, a flow restricting means in one of said discharge ducts, a movable valve member in said valve device so constructed and arranged as to permit said source to be unrestrictedly connected to either end of one of said cylinders and to corresponding ends of both of said cylinders, and for connecting the discharge end of both of said cylinders with both of said discharge ducts in the first instance and with that discharge duct only including said restricting device in said second instance, means for moving said movable valve member to effect said described connections including a plunger associated with each end of said movable valve member and a surrounding axially shiftable collar engageable with a corresponding end of said movable valve member, and means for admitting and releasing fluid under pressure to the axially outer ends of said plungers and collars.

11. In combination, a pair of cylinders, a piston in each of said cylinders, a source of fluid under pressure, a valve device connected with said source, ducts independently connecting each end of each of said cylinders with said valve device, a piston valve in said valve device operable when in one position to connect said source with both ducts leading to corresponding ends of both said cylinders and both ducts connected with the opposite ends of both said cylinders with a point of discharge, and when in another position to connect one end of one of said cylinders only with said source and the opposite end of said one of said cylinders only with said point of discharge, means for relieving suction created back of the piston in the other of said cylinders when said valve is in the last mentioned position, a plunger at each end of said piston valve, a reciprocable collar slidably surrounding each of said plungers, and means for selectively admitting and releasing fluid under pressure from the outer ends of said plungers and collars.

12. In a valve mechanism having a distributor slide movable in first and second respectively opposite directions, first and second plungers at the respective ends of the slide and having pressure faces spaced from the slide, means associated with the plungers disposed to actuate the slide through a full stroke in the first and second directions respectively, a collar slidably fitted over the second plunger between the pressure face thereof and the slide, means for limiting the travel of the collar in the second direction, and means between the collar and the slide and effective when the collar is in the limit position to limit travel of the slide to a part only of said stroke.

13. In a valve mechanism having a distributor slide movable in first and second respectively opposite directions, first and second plungers at the respectively opposite ends of the slide provided with pressure faces spaced from the slide, means associated with the plungers so that the first plunger is effective to actuate the slide through a full stroke in the first direction and the second plunger is effective to actuate the slide through a full stroke in the second direction, first and second collars slidably fitted over said first and second plungers respectively between the pressure faces thereof and the slide, means for limiting the travel of the first collar in the second direction and for limiting the travel of the second collar in the first direction, and means between each collar and the slide and effective when either collar is in its limit position to limit travel of the slide to a part only of said stroke in the corresponding direction.

14. In a valve mechanism having a distributor slide movable in first and second respectively opposite directions, first and second plungers at the respective ends of the slide and having pressure faces spaced from the slide, means associated with the plungers disposed to actuate the slide through a full stroke in the first and second directions respectively, a collar slidably fitted over the second plunger between the pressure face thereof and the slide, means for limiting the travel of the collar to a distance less than the full stroke of the slide, and means between the collar and the slide so that when the collar is in one limit position it forms a limit to said full stroke of the slide and when in its other limit position the collar limits the travel of the slide to a part only of the said full stroke.

ADOLF KEEL.